(12) United States Patent
Mullen

(10) Patent No.: US 10,307,905 B2
(45) Date of Patent: *Jun. 4, 2019

(54) TOOL COUPLING ARRANGEMENT

(71) Applicant: THE AMES COMPANIES, INC., Camp Hill, PA (US)

(72) Inventor: Joshua O. Mullen, Duncannon, PA (US)

(73) Assignee: The Ames Companies, Inc., Camp Hill, PA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/267,728

(22) Filed: Sep. 16, 2016

(65) Prior Publication Data

US 2018/0079067 A1    Mar. 22, 2018

(51) Int. Cl.
| | |
|---|---|
| *A01B 1/08* | (2006.01) |
| *A01B 1/22* | (2006.01) |
| *B25G 3/10* | (2006.01) |
| *B25G 3/26* | (2006.01) |
| *B25G 3/28* | (2006.01) |

(52) U.S. Cl.
CPC .................. *B25G 3/28* (2013.01); *A01B 1/08* (2013.01); *A01B 1/22* (2013.01); *B25G 3/10* (2013.01); *B25G 3/26* (2013.01)

(58) Field of Classification Search
CPC .... B25G 3/28; B25G 3/10; B25G 3/26; A01B 1/08; A01B 1/22; A01B 1/01; A01B 1/06; A01B 1/246; A01D 7/00
USPC ........................................................ 81/489
See application file for complete search history.

(56) References Cited

U.S. PATENT DOCUMENTS

| | | | | |
|---|---|---|---|---|
| 1,864,424 | A * | 6/1932 | Franklin | F16B 21/12 411/513 |
| RE22,749 | E * | 4/1946 | Mason | A47J 45/062 16/421 |
| 2,852,996 | A * | 9/1958 | Meyer | A01D 9/02 172/378 |
| 5,299,475 | A * | 4/1994 | Stroop | B25G 1/102 16/421 |
| 5,674,022 | A * | 10/1997 | Liao | A01B 1/22 172/371 |
| 5,774,938 | A | 7/1998 | Kent | |
| 7,818,843 | B2 * | 10/2010 | Kinskey | B25F 1/02 15/105 |

(Continued)

*Primary Examiner* — Hadi Shakeri
(74) *Attorney, Agent, or Firm* — Brooks Kushman P.C.

(57) ABSTRACT

A coupling for an elongated handle and a tool head is disclosed. The coupling includes a plug member, a ferrule, and a pin member. The plug member further comprises an elongated passage formed therein receives a tool head shank of the tool head. The elongated passage is in communication with a pair of aligned plug member openings formed through the plug member. The ferrule includes a pair of aligned ferrule openings. When the plug member is partially received within the ferrule, the plug member openings align with the ferrule openings. The pin member extends through the aligned ferrule openings and the plug member openings and through an opening of the tool head shank when the tool head shank is mounted in the elongated passage. The ends of the pin member are bent at an angle to an axis extending through the elongated passage to secure the tool head shank to the plug member and ferrule.

17 Claims, 12 Drawing Sheets

(56) References Cited

U.S. PATENT DOCUMENTS

| | | | |
|---|---|---|---|
| 8,746,767 B2* | 6/2014 | Mouch | B25G 1/04 15/145 |
| 2018/0072216 A1* | 3/2018 | Willodson | B60P 7/083 |

* cited by examiner

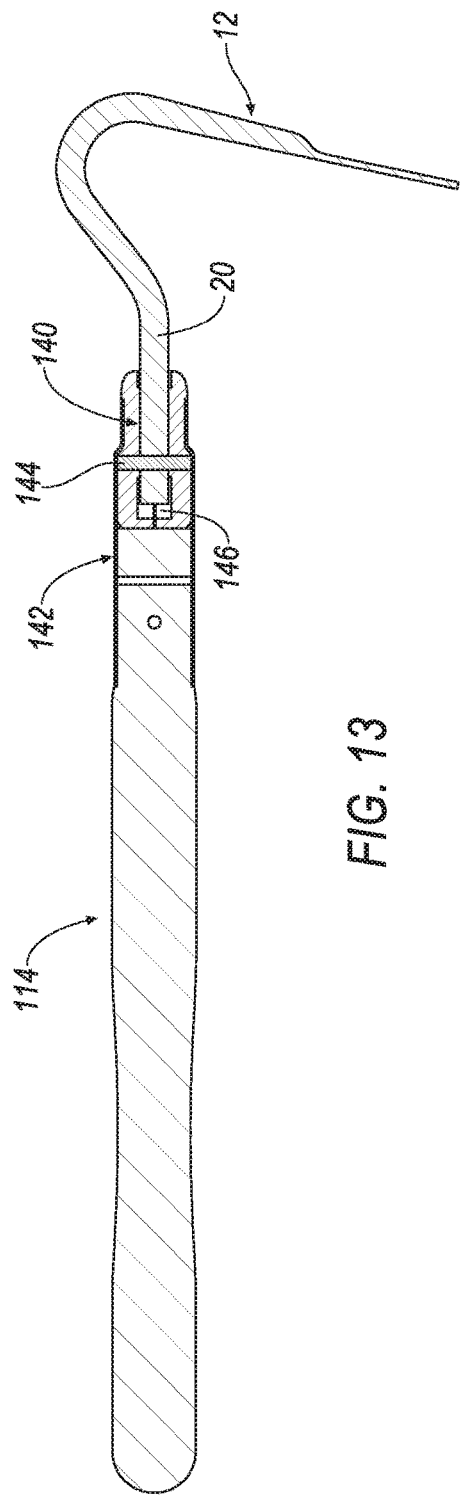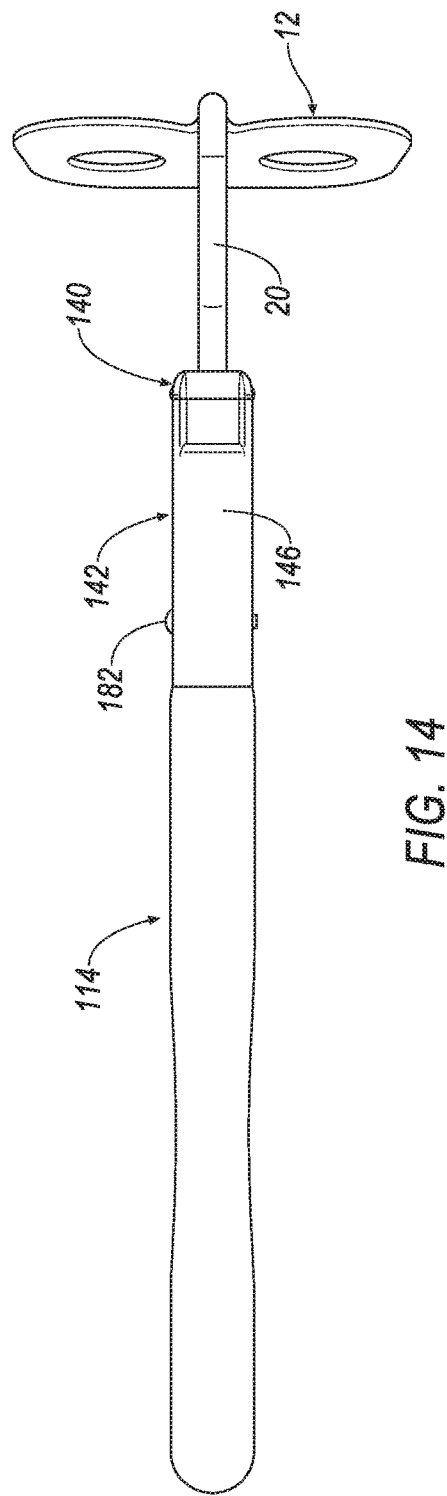
FIG. 13
FIG. 14

TOOL COUPLING ARRANGEMENT

TECHNICAL FIELD

The disclosure is directed to a coupling for joining a handle and a tool head, and more specifically, to an arrangement and method joining a handle to tool head that negates the need for an interference, press-fit relationship between mating components.

BACKGROUND

The current method of joining a handle and head involves drilling a hole in the end grain of a tapered wood section of handle. The tapered wood section of handle is then shrouded in a matching steel ferrule. The shank of the tool head is then pressed into the bored hole creating a press fit to retain the head to handle. However, this method requires a high level of precision in the relationships between mating components. For example, the press fit relies on a proper cross-sectional area relationship between the bore diameter and tool head shank.

Another issue that occurs with the known method outlined above concerns durability of the connection. More specifically, as the wood portion absorbs liquid, shrinks, or even rots, the press fit can be compromised, causing the shank to move within the wood handle or even rendering the tool inoperable.

Other coupling methods include the use of a standard fastener such as a nail or rivet that goes through the ferrule; handle material and hole in the tool shank. However, because the nail or rivet is introduced through the wood handle, the issues relating to durability of the tool may be effect. While epoxy adhesive to join the tool shank to the handle has also been known, over time, the epoxy can degrade.

SUMMARY

In a first embodiment, a coupling for an elongated handle and a tool head is disclosed. The coupling includes a plug member, a ferrule, and a pin member. The plug member further comprises an elongated passage formed therein receives a tool head shank of the tool head. The elongated passage is in communication with a pair of aligned plug member openings formed through the plug member. The ferrule includes a pair of aligned ferrule openings. When the plug member is partially received within the ferrule, the plug member openings align with the ferrule openings. The pin member extends through the aligned ferrule openings and the plug member openings and through an opening of the tool head shank when the tool head shank is mounted in the elongated passage. The ends of the pin member are bent at an angle to an axis extending through the elongated passage to secure the tool head shank to the plug member and ferrule.

BRIEF DESCRIPTION OF THE DRAWINGS

Exemplary embodiments of the present disclosure will now be described in greater detail with reference to the attached figures, in which:

FIG. 13 is a cross-sectional view of the tool coupling assembly taken along lines 13-13 of FIG. 12; and FIG. 14 is a top view of the tool coupling assembly of FIG. 9.

DETAILED DESCRIPTION

Figure 1:
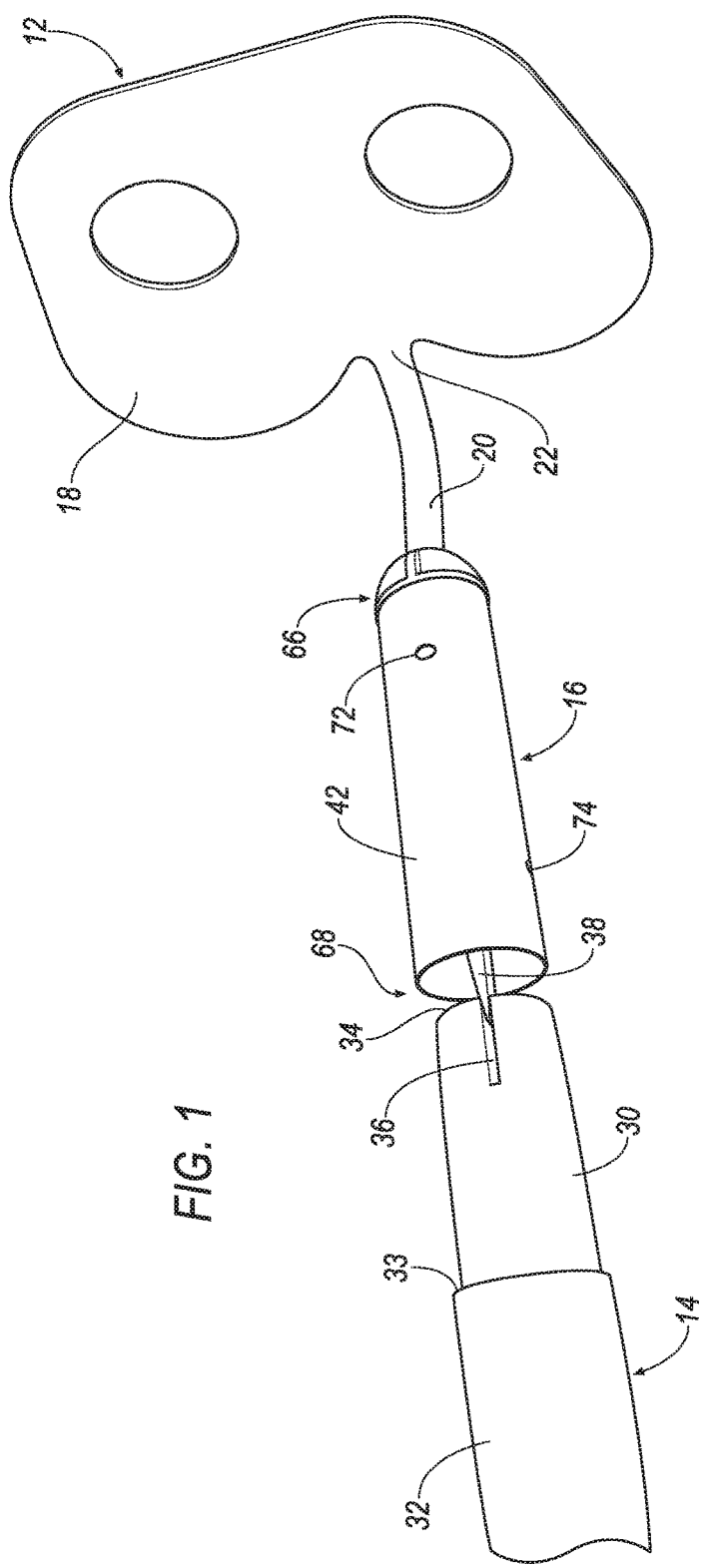
FIG. 1 is a partially exploded view of a first exemplary arrangement of a tool coupling assembly.

Referring now to the discussion that follows and also to the drawings, illustrative approaches to the disclosed assemblies and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Described herein are tool coupling assemblies, various components for use in same, and a method of constructing the tool coupling assembly. The components disclosed herein provide an improved assembly, while minimizing the need for tight manufacturing tolerances. While shown in connection with a particular tool head design, it is understood that various tools heads are envisioned.

Referring to FIG. 1 a tool assembly 10 includes a tool head 12, an elongated handle 14 and a coupling assembly 16. The tool head 12 may be any type of tool head. In one exemplary arrangement, the tool head 12 is configured as hoe. However, it is understood that other push/pull tool head 12 designs, such as rakes, scrapers, edgers, cultivators, and hooks, as well as hand tools such as, for example, trowels, are also contemplated in this disclosure.

Figure 2:
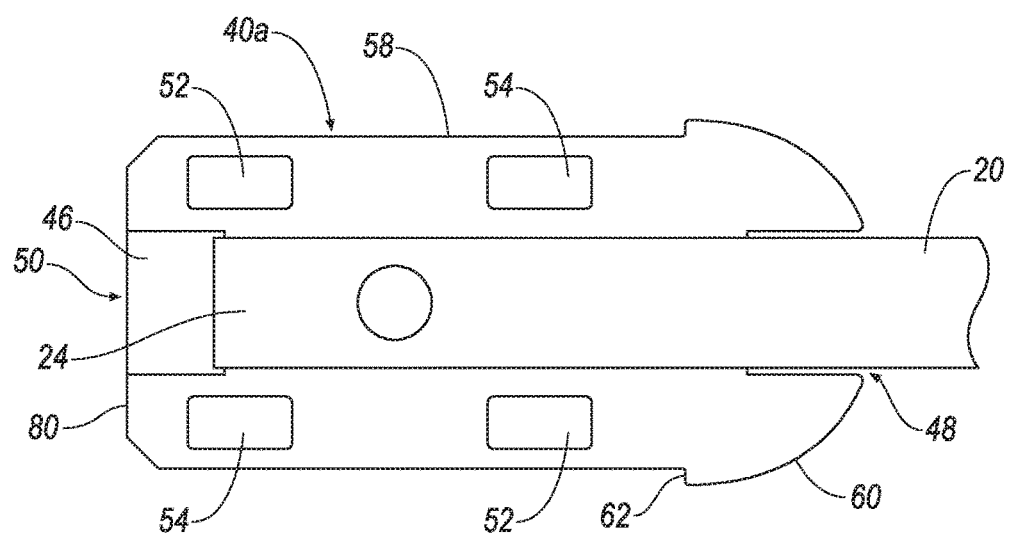
FIG. 2 is a partial cross-sectional view of a plug member and a tool head shank.

The tool head 12 has a body 18 configured to perform a function, e.g., dig, rake, etc. The tool head body 12, further includes a tool head shank 20 having a first end 22 fixedly connected to the tool head 12, and a second free end 24 (as best seen in FIG. 2). In one exemplary arrangement, first end 22 is integral with the tool head 12. The tool head shank 20 may have a variety of cross-sectional shapes. The tool head body 12 and the tool head shank 20 is made from a rigid and hard material, such as steel, that is generally not deformable. The tool head shank 20 further comprises an opening 25 extending therethrough, as best seen in FIG. 2.

Figure 5:
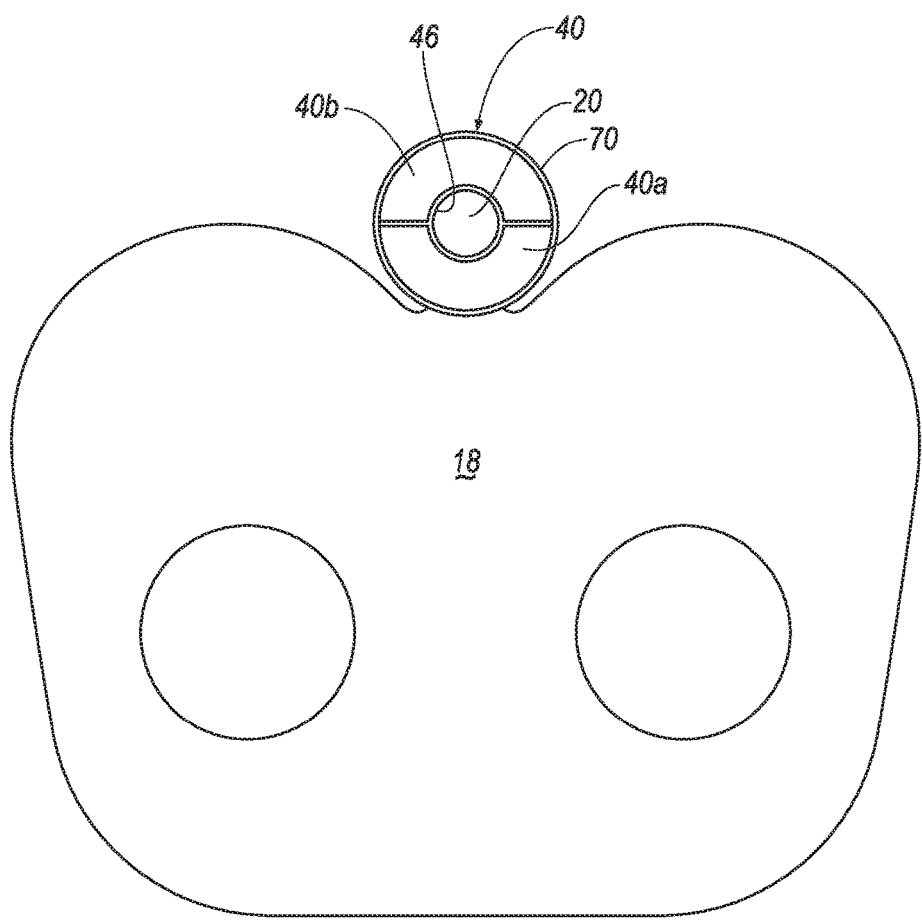
FIG. 5 is a plan view of the metal ferrule mounted to the plug member of FIG. 2, taken along axis A-A.

The handle 14 has an upper end 26 and a lower end (not shown). The upper end 26 includes an insertion section 30 and a grasping section 32. The insertion section 30 is defined by a distal end 34. The insertion section 30 is fixedly attached to the grasping section 32 and is sized to be smaller than the grasping section 32, such that an engagement flange 33 is formed where the handle attaches to the insertion section 30. In one exemplary arrangement, the insertion section 30 tapers inwardly toward a central axis extending through the handle 14 from the engagement flange 33 toward the distal end 34. A notch 36 may also be formed in the insertion section 30, extending from the distal end 34 along part of the insertion section 30, as shown in FIGS. 1 and 5. The notch 36 is configured to receive a wedge member 38. The wedge member 38 allows for providing a tight fitting press fit engagement with a portion of the coupling assembly 16, as will be discussed in further detail below.

Figure 3:
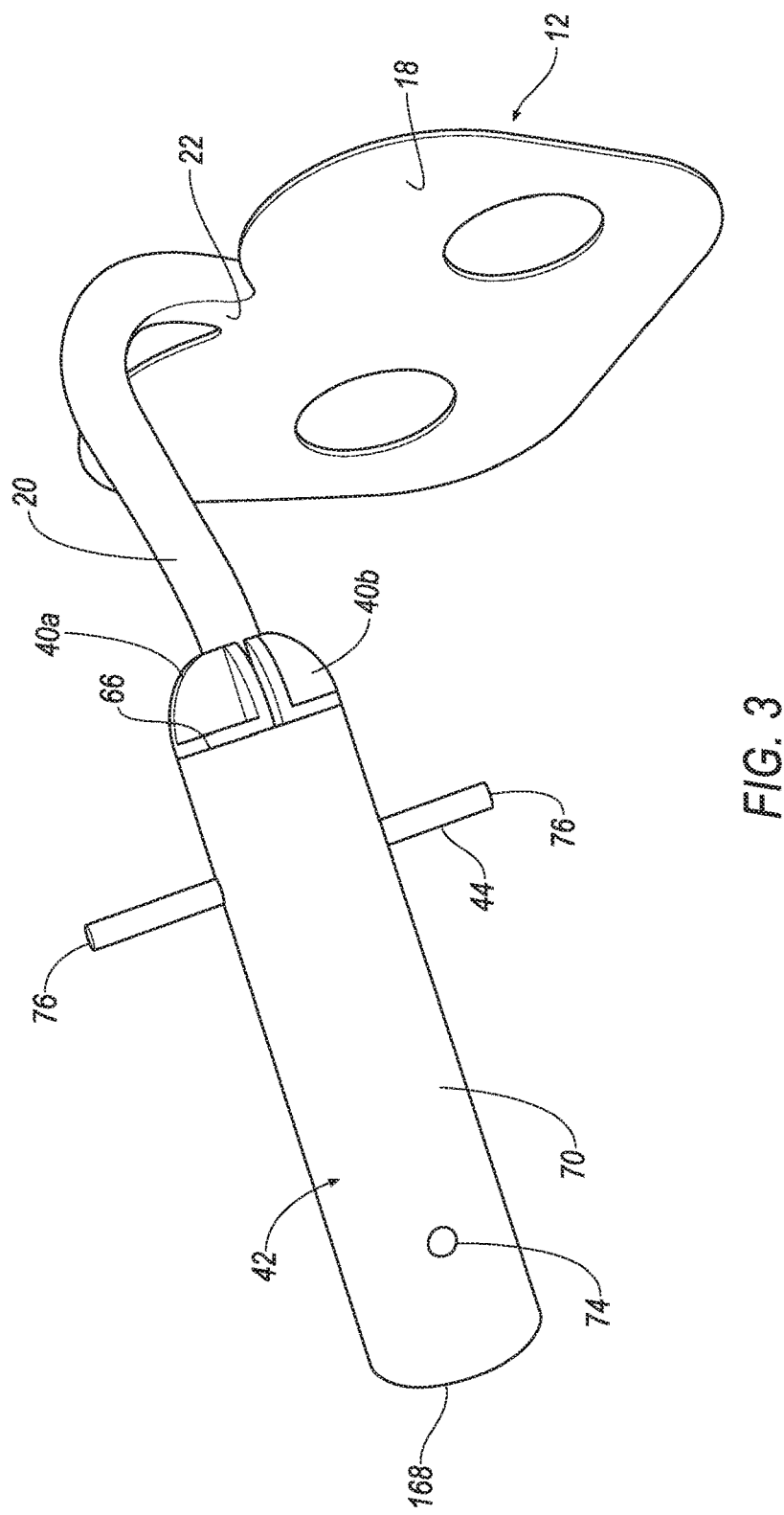
FIG. 3 is a perspective view of metal ferrule assembled to the plug member of FIG. 2.
Figure 4:
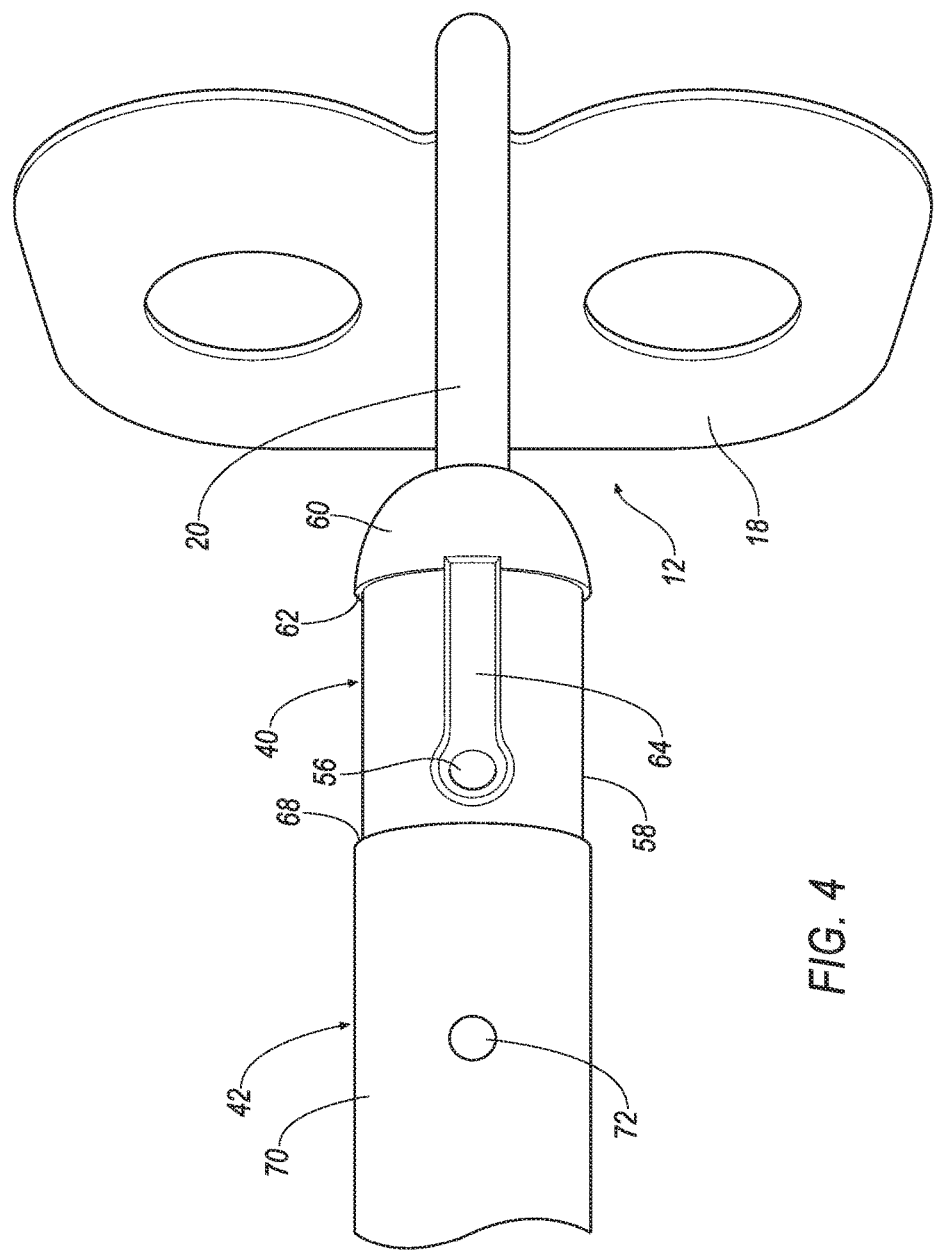
FIG. 4 is a perspective view of the metal ferrule being mounted to the plug member of FIG. 2.

Referring to FIGS. 2-4, details of the coupling assembly 16 will be discussed. Coupling assembly 16 further comprises a plug member 40, a ferrule 42 and a pin member 44. In one exemplary arrangement, the plug member 40 is configured as a two-piece clam shell design, where the two mating pieces 40a, 40b combine to form the plug member 40. While shown as two separate pieces, in one exemplary arrangement, mating pieces 40a, 40b may be joined with a hinge (not shown).

Plug member 40 further comprises a channel 46 extending from a first end 48 to a second end 50 of the plug member 40. The channel 46 is configured to have a complementary shape to the tool head shank 20, such that the tool head shank 20 may be selectively received within the channel 46, as shown in FIG. 2. Disposed on either side of channel 46 are connector elements 52, 54. In one exemplary arrangement, connector elements 52, 54 are configured as attachment tabs 52 and complementary openings 54. In one exemplary arrangement, each mating piece 40a, 40b includes at least one pair of connector elements 52, 54, with one attachment tab 52 disposed on one side of the channel 46, and one opening 54 disposed on the other side of the channel 46. In the particular arrangement shown, there are two pairs of connector elements 52, 54 with the attachment tabs 52 arranged on opposing sides of the channel 46, and the openings 54 also arranged on opposing sides of the channel 46. The mating pieces 40a, 40b are joined together such that the connector elements 52, 54 of the mating piece 40a mate with and join the connector elements 52, 54 of the mating piece 40b. When joined in this manner, the channels 46 of the mating pieces 40a, 40b cooperate for form an elongated passage, as shown in FIG. 5, for example. It is understood, however, that other connector elements 52, 54 are contemplated.

Each mating piece 40a, 40b also include an opening 56 extending therethrough. The plug member opening 56 aligns with the opening 25 disposed within tool head shank 20, when the tool head shank 20 is seated within the elongated passage formed by channels 46.

The plug member 40 includes a body section 58 and an end section 60. The outside diameter of the body section 58 is sized to be smaller than the outside diameter of the end section 60 such that a retaining edge 62 is formed where the end section 60 joins the body section 58. The outside surface of the body section 58 on each mating piece 40a, 40b of the plug member 40 further comprises a retaining groove 64, best seen in FIG. 4. The retaining groove 64 extends from the plug member opening 56 to the end section 60. The retaining groove 64 is configured to receive a portion of the pin member 44, as will be discussed in further detail below.

The plug member 40 may be constructed of a suitable polymer material which allows for ease of manufacturing the channel 46, connector elements 52, 54 and/or retaining groove 64. An example of a suitable material includes polymers with a high modulus of elasticity. Further examples include, but are not limited to, nylon, polycarbonate, flexible polyvinyl chloride (PVC), plyethylene terephthalate (PET); acrylonitrile-butadiene-styrene (ABS) and/or other thermoplastic materials.

The ferrule 42 is configured as a sleeve having a plug member end 66 and a handle end 68, with a body member 70 therebetween. The ferrule 42 further includes ferrule openings 72 extending through the body member 70, positioned closer to the plug member end 66 and handle openings 74 (shown in FIG. 8) also extending through the body member 70, disposed closer to the handle end 68. In one exemplary arrangement, the ferrule openings 72 are oriented approximately 90° from the handle openings 74. The body member 70 of the ferrule is configured with a slight taper such that the body member 70 extends inwardly toward a central axis from the handle end 68 to the plug member end 66.

The ferrule 42 may be constructed of a metal material. In one exemplary arrangement, the ferrule 42 is constructed of steel that allows for some selective deformation, as explained below.

A method of assembling a tool handle to a tool head using coupling assembly 16 will now be described. Referring to FIG. 2, the plug member 40 is first opened such that the mating components 40a, 40b are separated from one another to expose channel 46. The tool head shank 20 is inserted into the channel 46 of a first of the mating components 40a, with the opening 25 of the tool head shank 20 aligning with one of the plug member openings 56 of the first of the mating components 40a. Next, the second of the mating component 40b is mounted to the first of the mating components 40a, so as to capture the tool head shank 20 therebetween. The connector elements 52, 54 of the mating components 40a, 40b are then engaged together.

Next, referring to FIGS. 3 and 4, the ferrule 42 is slid onto the plug member 40. This action compresses mating components 40a, 40b together, securing the tool head shank 20 therein. The plug member end 66 abuts against the retaining edge 62 of the end section 60 of the plug member 40. The ferrule opening 72 is aligned with the plug member opening 56.

Figure 6:
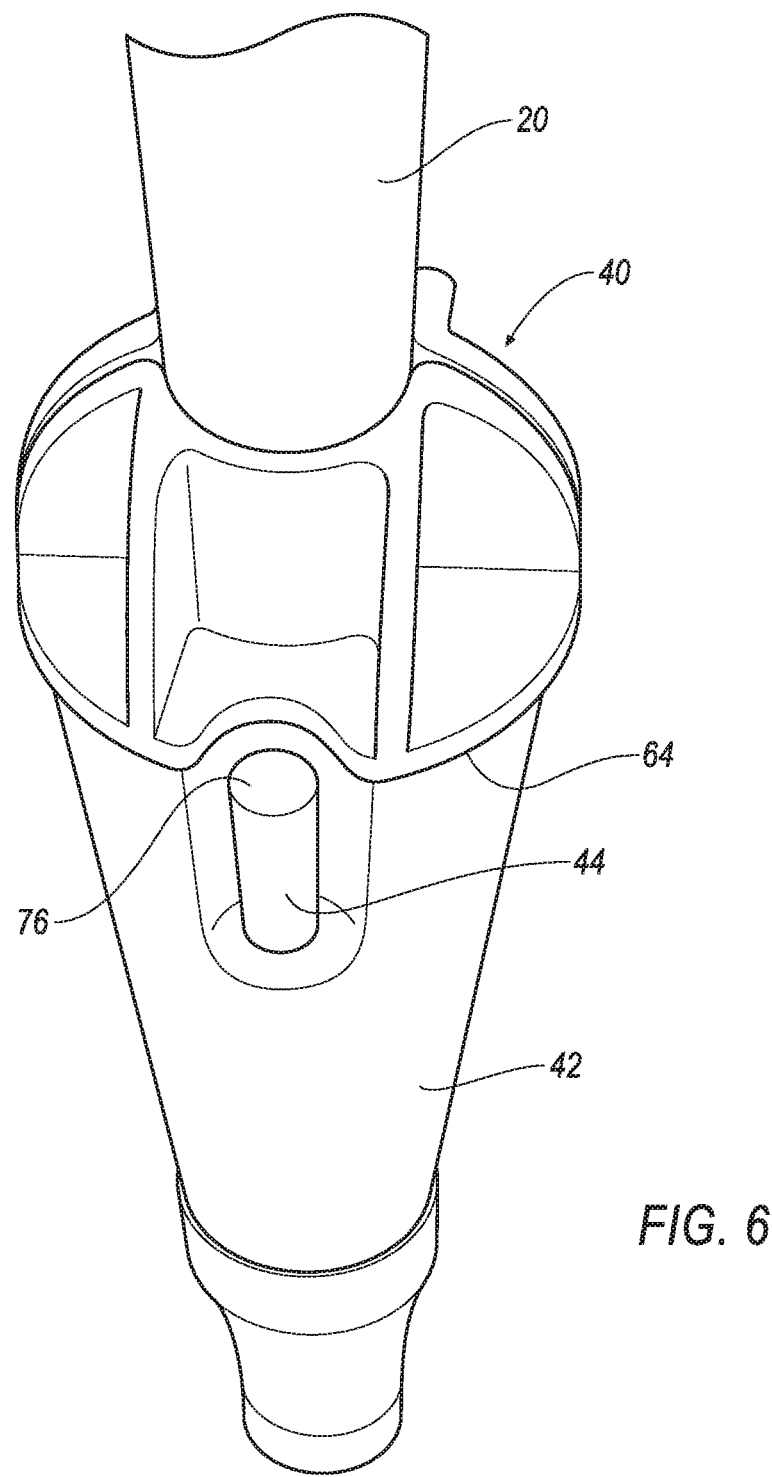
FIG. 6 is a perspective view of the metal ferrule mounted to the plug member of FIG. 2, with an attachment pin in a securing position.
Figure 7:
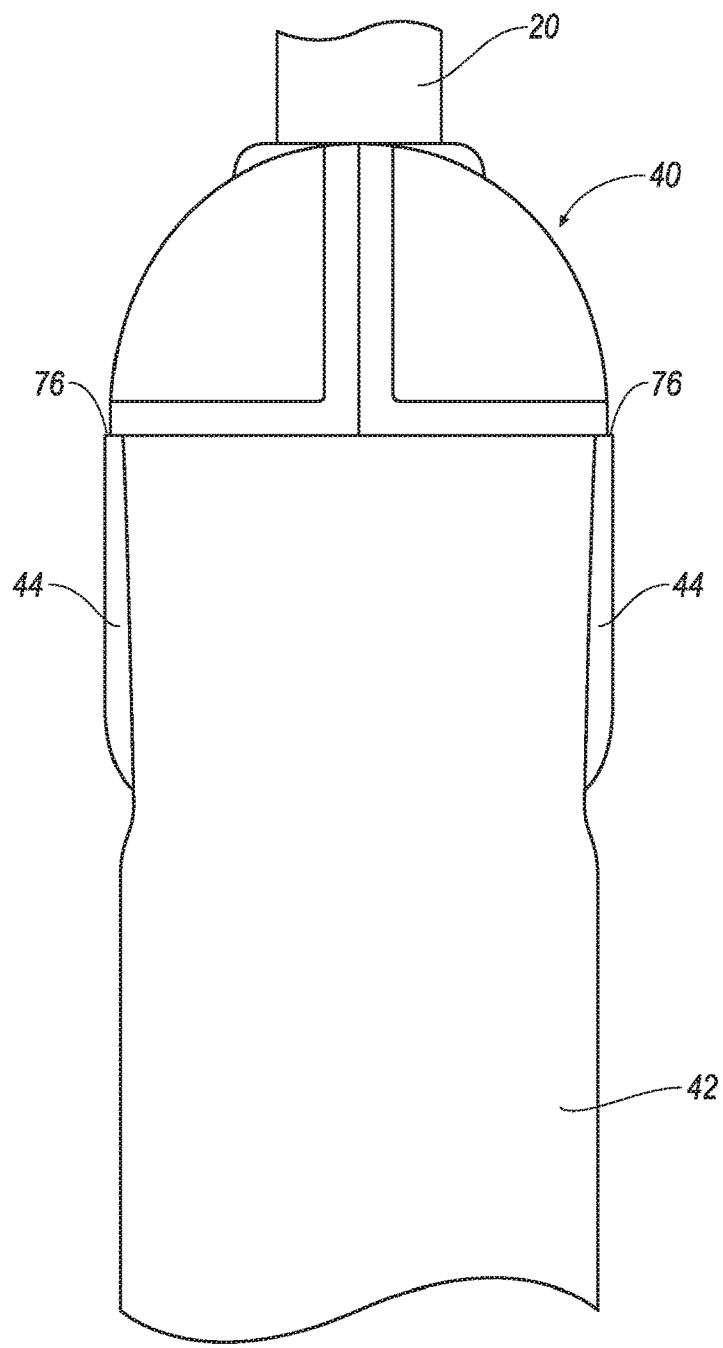
FIG. 7 is an elevational view of the metal ferrule mounted to the plug member of FIG. 2, with the attachment pin in the securing position.
Figure 8:
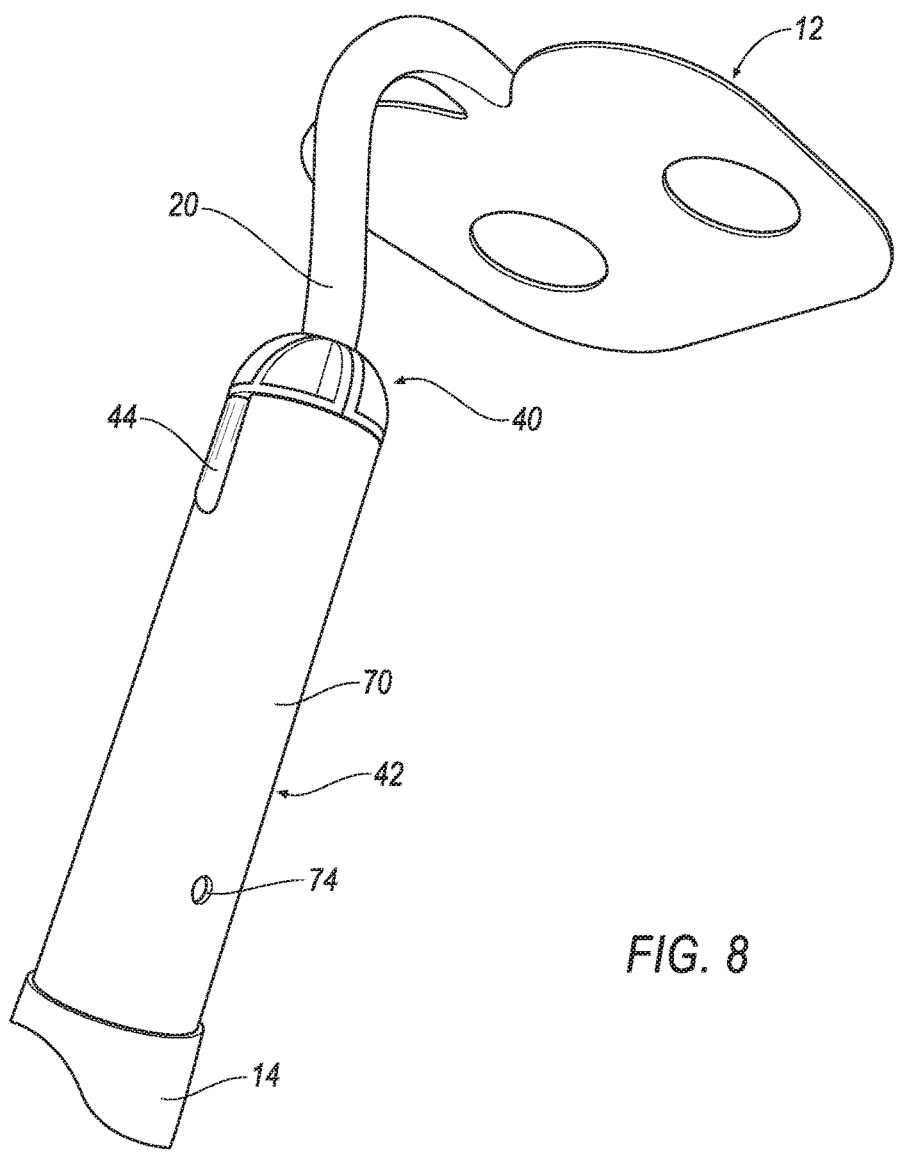
FIG. 8 is a perspective view of the tool coupling assembly of FIG. 1 in an assembled configuration.

Once the ferrule 42 is fully seated on the plug member 40, the pin member 44 is inserted through the aligned ferrule openings 72/plug member openings 56/opening 25, as shown in FIG. 3. The pin member 44 may be constructed of low carbon steel or other suitable alloy material. Next, ends 76 of the pin member 44 are bent approximately 90° toward the tool head 12. When bent in this manner, the ferrule 42 is deformed into the retaining grooves 64 of the plug member 40 as best shown in FIGS. 6-8. The deformation of the ferrule 42 in this manner crimps the ferrule 42 onto the plug member 40 and retains the tool head 12 to the ferrule 42. Once assembled in this manner, the tool head 12 can only be pulled from the ferrule 42 by shearing the pin or propagating a fracture around the ferrule opening 72.

Once the ferrule 42 is attached to the plug member 40, the handle 14 is mounted to the ferrule 42. More specifically, referring to FIG. 1, the wedge member 38 is partially inserted into the notch 36 so as to seat the wedge member 38 within the notch 36. The wedge member 38 has a triangular cross-sectional shape such that a first end is wider than a second end. Thus, the second end is disposed within the notch 36 first. Next, the insertion section 30 of handle 14 is inserted into the handle end 68 of the ferrule 42 until an edge 78 of the ferrule 42 is seated against the engagement flange 33. As the insertion section 30 is seated within the ferrule 42, the wedge member 38 is driven further into the notch 36 when it contacts the end 80 (FIG. 2) of the plug member 40, thereby expanding the insertion section 30 of handle 14 due to the triangular cross-section shape of the wedge member 38. This action serves to frictionally retain the insertion section 30 against the interior walls of the ferrule 42. Once the handle 14 is seated within the ferrule 42, a fastening element may be inserted through handle openings 74.

An alternative arrangement of a coupling assembly 116 is illustrated in FIGS. 9-14. For ease of reference, elements relating to the tool head 12 and elongated handle 14 utilize the same reference numbers above. Coupling assembly 116 further comprises a plug member 140, a ferrule 142 and a pin member 144. In one exemplary arrangement, the plug member 140 is configured as a two-piece clam shell design, where the two mating pieces 140a, 140b combine to form the plug member 140.

Figure 11:
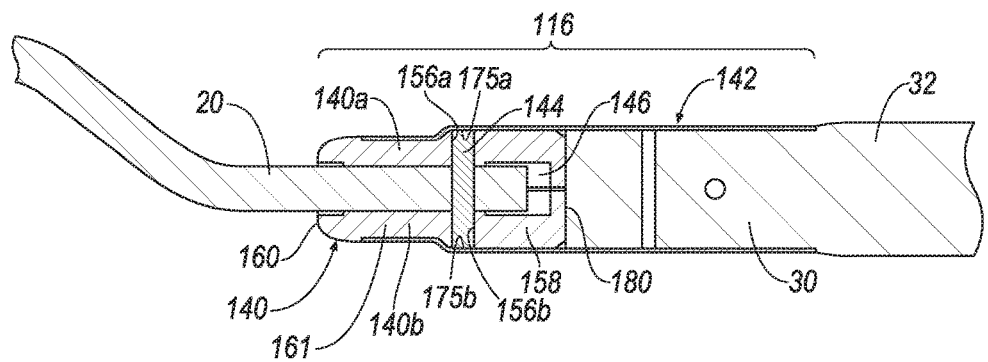
FIG. 11 is a partial cross-sectional view of the tool coupling assembly from encircled area 11 of FIG. 10.
Figure 12:
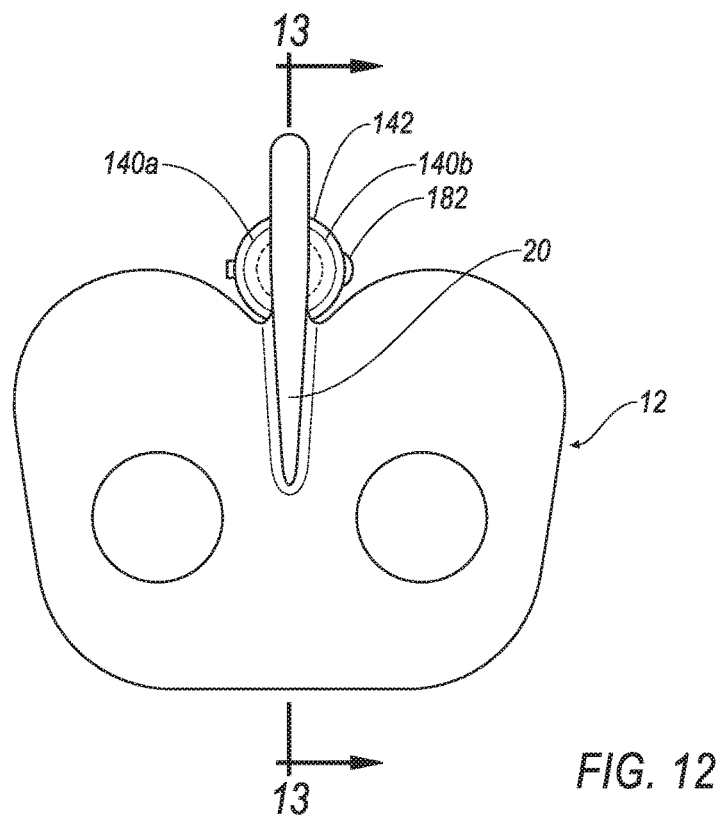
FIG. 12 is an end view of the tool coupling assembly of FIG. 9.

Plug member 140 further comprises a channel 146 extending from a first end 148 to a second end 150 of the plug member 140. The channel 146 is configured to have a complementary shape to the tool head shank 20, such that the tool head shank 20 may be selectively received within the channel 146, as shown in FIG. 11-13. Disposed on either side of channel 146 are connector elements 152, 154 (best seen in FIG. 9). In one exemplary arrangement, connector elements 152, 154 are configured as attachment tabs 152 and complementary openings 154. In one exemplary arrangement, each mating piece 140a, 140b includes at least one pair of connector elements 152, 154, with one attachment tab 152 disposed on one side of the channel 146, and one opening 154 disposed on the other side of the channel 146. In the particular arrangement shown, there are two pairs of connector elements 152, 154 with the attachment tabs 152 arranged on opposing sides of the channel 146, and the openings 154 also arranged on opposing sides of the channel 146. The mating pieces 140a, 140b are joined together such that the connector elements 152, 154 of the mating piece 140a mate with and join the connector elements 152, 154 of the mating piece 140b. When joined in this manner, the channels 146 of the mating pieces 140a, 140b cooperate for form an elongated passage, as shown in FIG. 11, for example. It is understood, however, that other connector elements 152, 154 are contemplated.

Each mating piece 140a, 140b also include a mount groove 156a, 156b extending transverse to the channel 146. The mount grooves 156a, 156b are best seen in FIGS. 11-13. More specifically, the mount grooves 156a, 156b each extend from channel 146 and extend inwardly through the cross-section of each mating piece 140a, 140b. The mount grooves 156a, 156b are configured to receive the pin member 144 therein, as will be explained in further detail below. In one exemplary arrangement, the mount grooves 156, 156b do not extend all the way through the respective mating pieces 140a, 140b of the plug member 140, such that the mount grooves 156a, 156b are not opened to the outside surface of the mating pieces 140a, 140b. Alternatively, the mount groves 156, 156b may extend through the cross-section of each mating piece 140a, 140b for ease of manufacturing. The mount grooves 156a, 156b are configured to align with one another, as well as align with the opening 25 disposed within tool head shank 20, when the tool head shank 20 is seated within the elongated passage formed by the mating channels 146.

The plug member 140 further includes a body section 158, an end section 160 and an intermediate section 161 therebetween. The outside diameter of the body section 158 is sized to be larger than the outside diameter of the end section 160 and the intermediate section 161, such that the plug member 140 tapers inwardly toward the a central axis extending through the plug member 140. The outside diameter of the intermediate section 161 is sized to be smaller than the outside diameter of the end section 160 such that a retaining edge 162 is formed where the end section 160 joins the intermediate section 158.

The plug member 140 may be constructed of a suitable polymer material which allows for ease of manufacturing the channel 146, connector elements 152, 154 and/or mount grooves 156a, 156b. Suitable materials include, but are not limited to, thermoplastic elastomer, polycarbonate, flexible polyvinyl chloride (PVC), polyurethane, and/or rubber material.

The ferrule 142 is configured as a sleeve having a plug member end 166 and a handle end 168, with a body member 170 therebetween. Unlike ferrule 42, ferrule 142 does not include ferrule openings extending through the body member 170, but does include a handle opening 174 (shown in FIG. 9) extending through the body member 170, disposed closer to the handle end 168. In one exemplary arrangement, the handle openings 174 are oriented approximately 90° from the axis that the channel 146 of the plug member 140 lies. The ferrule 142 may be constructed of a metal material. In one exemplary arrangement, the ferrule 142 is constructed of steel that allows for some selective deformation, as explained below.

Figure 9:
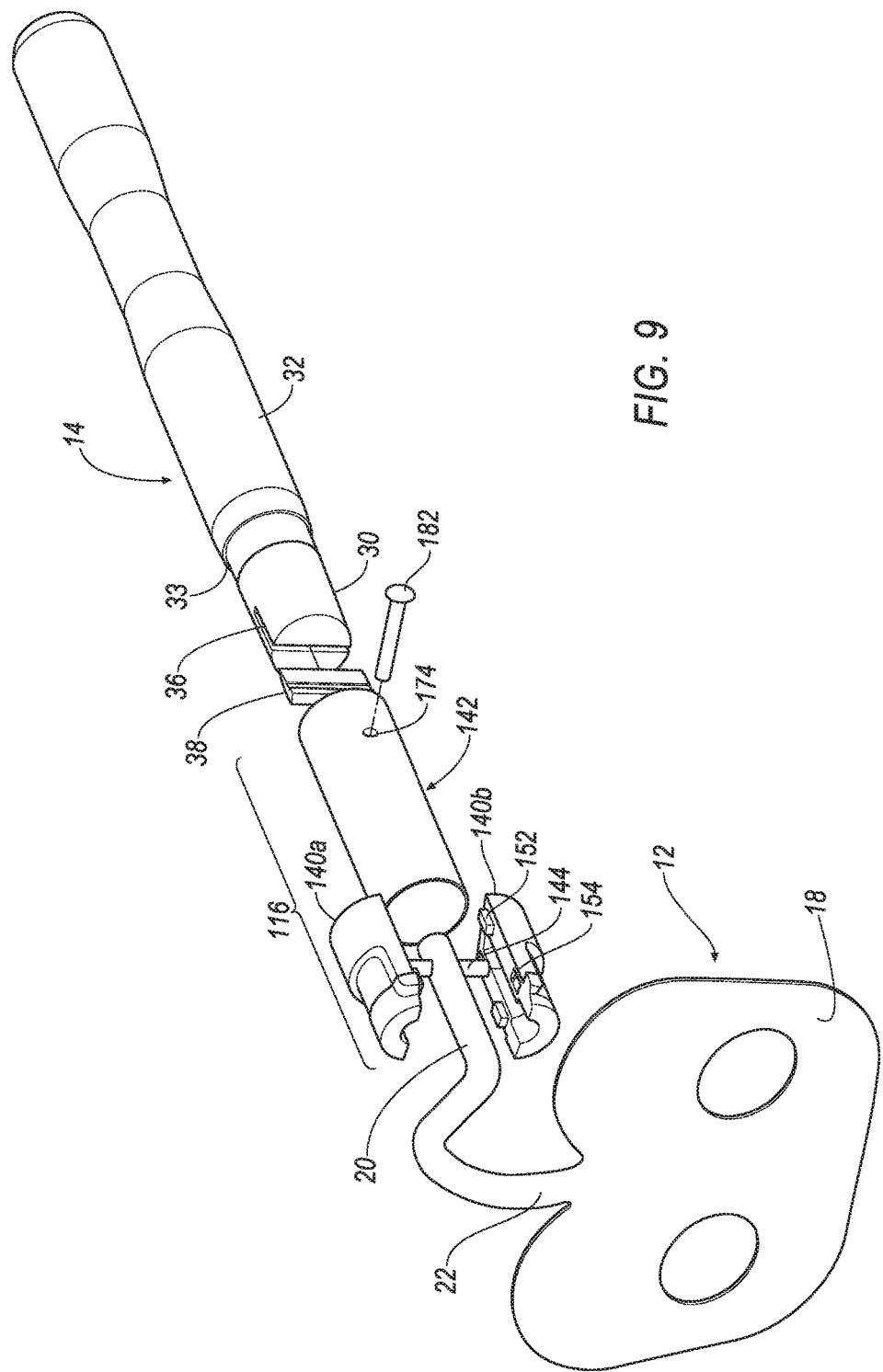
FIG. 9 is a partially exploded view of a second exemplary arrangement of a tool coupling assembly.
Figure 10:
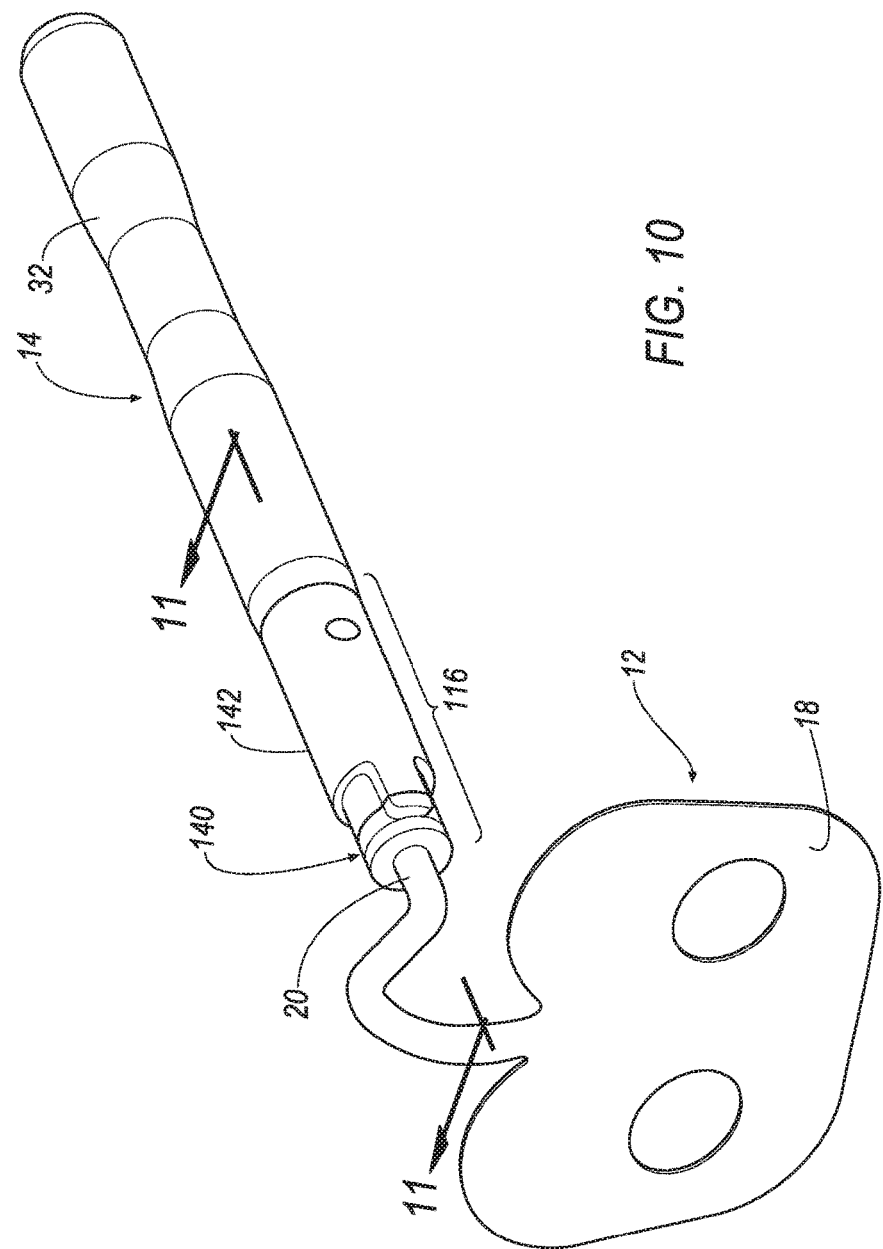
FIG. 10 is a perspective view of the tool coupling assembly of FIG. 9 in an assembled configuration.

A method of assembling a tool handle to a tool head using coupling assembly 116 will now be described. Referring to FIGS. 9-11, the plug member 140 is first opened such that the mating components 140a, 140b are separated from one another to expose channel 146. In one exemplary arrangement, the tool head shank 20 is inserted into the channel 146 of a first of the mating components 140a, with the opening 25 of the tool head shank 20 aligning with the mount groove 156a of the first of the mating components 40a.

Next, the pin member 144 is directed through the tool head shank 20 and secured within the mount groove 156a. When this is completed the tool head shank 20 is operatively connected to the first of the mating pieces 140a of the plug member 140. Alternatively, the pin member 144 may be disposed within the mount groove 156a and the tool head shank 20 may be directed over the pin member 144 with the opening 25 of the tool head shank 20 receiving the pin member 144 therein as the tool head shank 20 is directed into the channel 146.

Once the tool head shank 20 is secured to one of the mating pieces 140a, the second mating piece 140b, is then positioned over the first mating piece 140a, such that the mount groove 156b of the second mounting piece 140b is mounted onto the pin member 144, with the tool shank 20 being disposed within the channel 146. The connector element 152, 154 of the respect mating pieces 140a, 140b are engaged in either a frictional engagement or snap fit arrangement, securing the two mating pieces 140a, 140b together to trap the tool head shank 20 within the plug member 140. In this arrangement, the pin member 144 is sized to have a length is equal to or slightly less than a distance between the ends 175a, 175b of the mount grooves 156a, 156b, when the mating pieces 140a, 140b are joined together, such that the ends of the pin member 144 do not extend outwardly from an outer surface of the plug member 140.

Once the plug member 140 is assembled, the ferrule 142 is slid onto the plug member 140. This action will further compress the mating components 140a, 140b together, securing the tool head shank 20 therein. The plug member end 166 is positioned adjacent the retaining edge 162 of the end section 160 of the plug member 140. Once positioned, the plug member end 166 is crimped around the body section 158 and intermediate section 161 and engaged with the retaining edge 162, as shown, for example, in FIG. 11. The end section 160 of the plug member 140 protrudes from the ferrule 142.

Once the ferrule 142 is attached to the plug member 140, the handle 14 is mounted to the ferrule 142. In one exemplary arrangement, the wedge member 38 is partially inserted into the notch 36 so as to seat the wedge member 38 within the notch 36. Next, the insertion section 30 of handle 14 is inserted into the handle end 168 of the ferrule 142 until an edge 178 of the ferrule 142 is seated against the engagement flange 33 of the handle 14. As the insertion section 30 is seated within the ferrule 142, the wedge member 38 is driven further into the notch 36 when it contacts the end 180 (FIG. 11) of the plug member 140, thereby expanding the insertion section 30 of handle 14 to frictionally retain the insertion section 30 against the interior walls of the ferrule 142. Once the handle 14 is seated within the ferrule 42, a fastening element 182 may be inserted through handle openings 174.

It will be appreciated that the tool coupling assemblies and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed is:

1. A coupling for an elongated handle and a tool head, the tool head having a tool head shank supporting tool body, the tool head shank having an opening extending through the tool head shank, the coupling comprising:
   a plug member;
   a ferrule; and
   a pin member,
   wherein the plug member further comprises a pair of aligned plug member openings, a pair of retaining grooves formed on an outside surface of the plug member, and an elongated passage formed within the plug member, wherein each retaining groove extends from one of the plug member openings and wherein the elongated passage is configured to receive the tool head shank and is in communication with the plug member openings;
   wherein the ferrule further comprises a pair of aligned ferrule openings, and wherein the plug member is partially received within the ferrule, with the plug member openings aligning with the ferrule openings, wherein the ferrule is selectively deformable around an outside surface of the plug member, and
   wherein the pin member extends through the aligned ferrule openings and the plug member openings and through the opening of the tool head shank when the tool head shank is mounted in the elongated passage, each of the free ends of the pin member being bent toward an axis extending through the elongated passage on opposite sides of the ferrule, thereby securing the tool head shank to the plug member and ferrule.

2. The coupling assembly of claim 1, wherein the plug member further comprises first and second mating pieces that selectively join together to form the plug member.

3. The coupling assembly of claim 2, wherein the first and second mating pieces further comprise connector elements that cooperate to join the first and second mating pieces together.

4. The coupling assembly of claim 3, wherein the connector elements further comprise at least one attachment tab mounted the first mating piece and a complimentary opening configured for receiving the attachment tab formed on the second mating piece.

5. The coupling assembly of claim 2, wherein each of the first and second mating pieces further comprise channel sections that align with one another to form the elongated passage when the first and second mating pieces are joined together.

6. The coupling assembly of claim 1, wherein the retaining groove extends parallel to the axis extending through the elongated passage.

7. The coupling assembly of claim 6, wherein the retaining groove extends toward a forward end portion of the plug member.

8. The coupling assembly of claim 1, wherein the ferrule is deformed when the ends of the pin member are disposed within the retaining grooves.

9. The coupling assembly of claim 8, wherein the ends of the pin member are bent 90° to dispose the pin members within the retaining grooves.

10. The coupling assembly of claim 1, wherein the ferrule is tapers inwardly toward a central axis extending through the ferrule from a handle end to a plug end.

11. The coupling assembly of claim 1 wherein the plug member further comprises an end portion and a body portion, wherein an outside diameter of the end portion is larger than an outside diameter of the body portion such that a retaining edge is formed where the end portion joins the body portion.

12. The coupling assembly of claim 1, wherein the pin member is bent 90° with respect to the axis extending through the elongated passage.

13. A coupling for an elongated handle and a tool head, the tool head having a tool head shank supporting tool body, the tool head shank having an opening extending through the tool head shank, the coupling comprising:
- a plug member comprising first and second mating pieces that selectively join together to form the plug member, each of the first and second mating pieces further comprising channel section that align with one another to form an elongated passage that is configured to receive the tool head shank, the elongated passage being in communication with a pair of aligned plug member openings extending through the plug member, and a pair of retaining grooves formed on an outside surface of the plug member, each retaining groove extending from one of the plug member openings parallel to an axis extending through the elongated passage;
- a ferrule comprising a pair of aligned ferrule openings, and wherein the plug member is partially received within the ferrule, with the plug member openings aligning with the ferrule openings, wherein the ferrule is selectively deformable around an outside surface of the plug member; and
- a pin member extending through the aligned ferrule openings and the plug member openings and through the opening of the tool head shank when the tool head shank is mounted in the elongated passage, the ends of the pin member being bent about 90° to move the ends of the pin on opposite sides of the ferrule toward an axis extending through the elongated passage, thereby deforming the ferrule when the ends of the pin member are disposed within the retaining grooves to secure the tool head shank to the plug member and ferrule.

14. A tool comprising:
- a tool head having a tool head shank connected thereto, the tool head shank having an opening extending therethrough;
- a handle; and
- a coupling assembly operable to connect the handle to the tool head;
- wherein the coupling assembly further comprises a plug member, a ferrule and a pin member, the plug member having an elongated passage formed therein that is configured to receive the tool head shank, the elongated passage being in communication with a pair of aligned plug member openings, a pair of retaining grooves formed on an outside surface of the plug member, each retaining groove extending from one of the plug member openings;
- wherein the ferrule further comprises a pair of aligned ferrule openings, and wherein the plug member is partially received within the ferrule, with the plug member openings aligning with the ferrule openings, and
- wherein the pin member extends through the aligned ferrule openings and the plug member openings and through the opening of the tool head shank when the tool head shank is mounted in the elongated passage of the plug member, the ends of the pin member being bent at an angle toward an axis extending through the elongated passage such that the ends of the pin members are disposed within the retaining grooves and deform a portion of the ferrule between the pin and the retaining groove to secure the tool head shank to the plug member and ferrule.

15. The tool of claim 14, wherein an insertion end of the handle further comprises a notch formed transverse to the central axis of the handle, the notch extending inwardly from a first end into the handle.

16. The tool of claim 15, further comprising a wedge member, wherein the wedge member is configured to be received within the notch to expand the insertion end of the handle during insertion of the handle within the ferrule.

17. The tool of claim 16, wherein the wedge member has a triangular cross-sectional shape such that a first end of the wedge member is wider than a second end of the wedge member.

* * * * *

UNITED STATES PATENT AND TRADEMARK OFFICE
CERTIFICATE OF CORRECTION

PATENT NO. : 10,307,905 B2
APPLICATION NO. : 15/267728
DATED : June 4, 2019
INVENTOR(S) : Joshua O. Mullen Page 1 of 1

It is certified that error appears in the above-identified patent and that said Letters Patent is hereby corrected as shown below:

In the Claims

Column 8, Lines 41-42, Claim 4:
After "one attachment tab mounted"
Insert -- to --.

Column 8, Lines 62-63, Claim 10:
After "wherein the ferrule is"
Delete "tapers" and
Insert -- tapered --.

Signed and Sealed this
Twelfth Day of November, 2019

Andrei Iancu
*Director of the United States Patent and Trademark Office*